Figure 1:
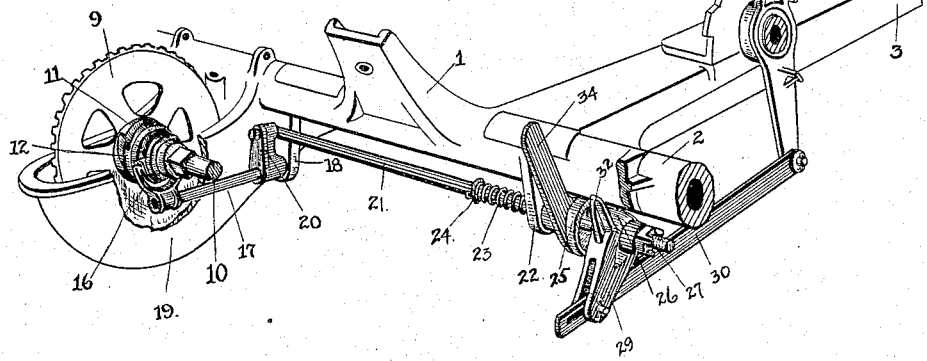

E. C. SMITH.
MOWING MACHINE.
APPLICATION FILED SEPT. 1, 1914.

1,174,630.

Patented Mar. 7, 1916.
2 SHEETS—SHEET 1.

WITNESSES:
Rose A. Leduc
Gertrude M. Pitz

INVENTOR:
Ernest C. Smith,
BY
Frank C. Curtis,
ATTORNEY.

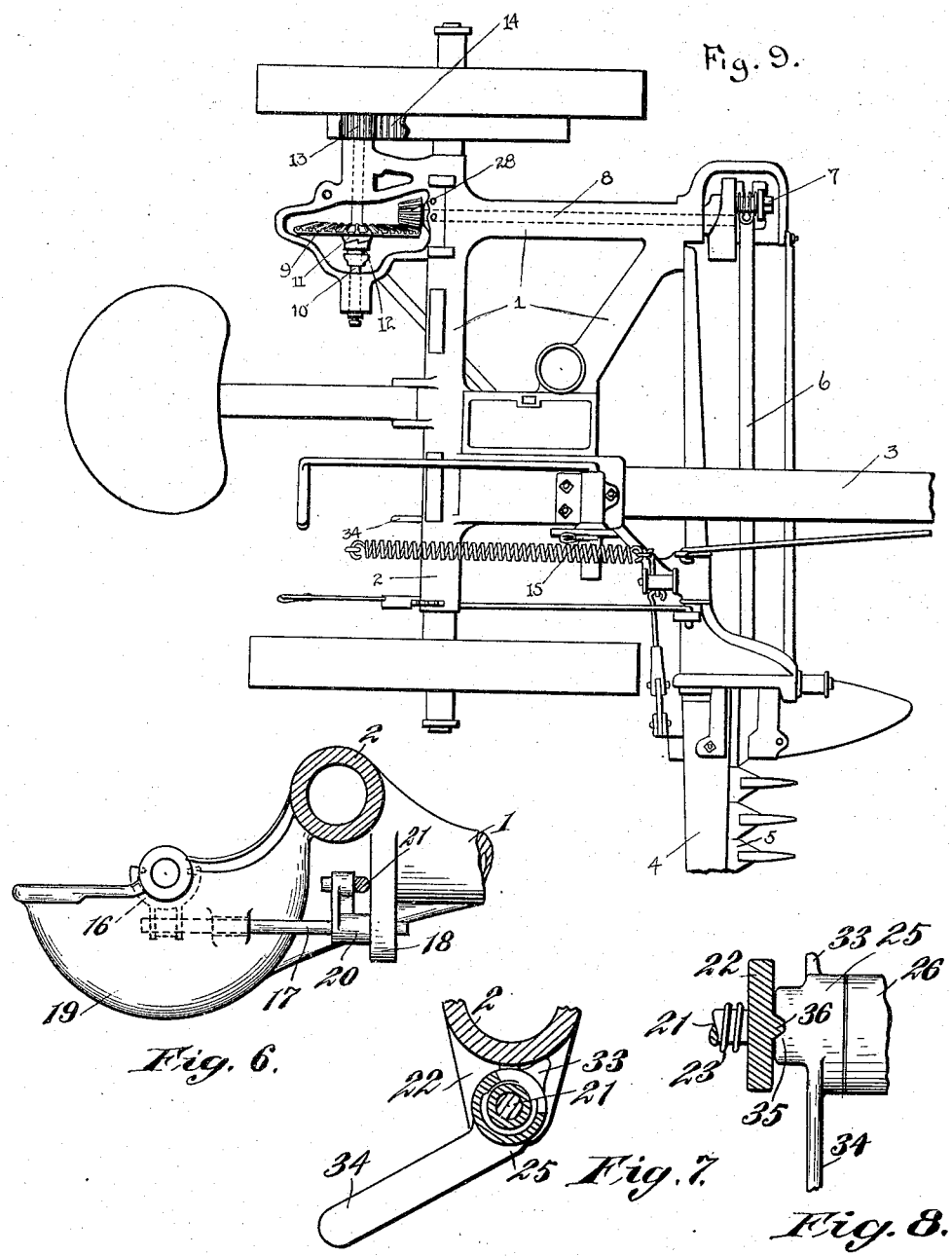

UNITED STATES PATENT OFFICE.

ERNEST C. SMITH, OF HOOSICK FALLS, NEW YORK, ASSIGNOR TO WALTER A. WOOD MOWING & REAPING MACHINE COMPANY, OF HOOSICK FALLS, NEW YORK, A CORPORATION OF NEW YORK.

MOWING-MACHINE.

1,174,630.     Specification of Letters Patent.     Patented Mar. 7, 1916.

Application filed September 1, 1914. Serial No. 859,642.

*To all whom it may concern:*

Be it known that I, ERNEST C. SMITH, a citizen of the United States, residing at Hoosick Falls, county of Rensselaer, and State of New York, have invented certain new and useful Improvements in Mowing-Machines, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Figure 1 of the drawings is a rear view in perspective of a portion of a mowing machine, showing my improved mechanism for disconnecting the knife-driving mechanism either automatically as the cutter-bar is raised, or manually while the cutter bar is lowered. Figs. 2, 3, 4, and 5 are like views in rear elevation of a part of the machine, showing different positions of the cams whereby the knife-driving mechanism is disengaged. Fig. 6 is a vertical longitudinal section taken transversely of the axle of the machine, showing in side elevation the bearings for the clutch-operating shaft. Fig. 7 is a vertical cross-section taken on the broken line VII—VII in Fig. 4. Fig. 8 is a horizontal cross-section taken on the broken line VIII—VIII in Fig. 3. Fig. 9 is a top plan view of a mowing machine embodying my invention with the cutter-bar and pole partly broken away.

In mowing machines of the type to which this invention relates, the cutter-bar extends laterally from one side of the machine with which it is connected at its inner end by means of a hinge which permits the bar to be swung toward or from the ground, and a hand-lever is accessible to the seated operator of the machine, whereby the cutter-bar can be so raised or lowered. In such machines it is desirable that the cutting action of the knife be discontinued when the cutter-bar is raised, and cam-mechanism has been provided whereby, as the cutter-bar is raised, a clutch controlling the knife-driving mechanism is automatically disengaged. In such machines it is also desirable to disengage the knife-driving mechanism, while the cutter-bar is in lowered position, should the operator leave the machine for a time or have occasion to make some adjustment or repair to the cutting-mechanism.

The object of the present invention is to provide by means of a simple coöperating mechanism for disconnecting the knife-driving mechanism either automatically as the cutter-bar is raised, or manually while the cutter-bar is lowered.

Referring to the drawings wherein the invention is shown in preferred form, 1 is the main-frame having the hollow axle, 2 and tongue, 3.

The cutter-bar, 4, has a knife, 5, adapted to be operated by a pitman 6, connected with a crank, 7, on the longitudinal shaft, 8, the rear end of which shaft has a beveled pinion, 28, adapted to engage a beveled gear, 9, loosely mounted on a cross-shaft, 10, with which cross-shaft it is adapted to be operatively connected at certain times by means of a clutch-member, 11, fixed upon the beveled gear, 9, and a clutch-member, 12, slidably mounted upon the cross-shaft, 10, and connected to rotate with said cross-shaft. The cross-shaft, 10, has a pinion, 13, fixed thereupon, which meshes with an internal gear on the hub of neighboring traction-wheel, 14. The cutter-bar can be raised and lowered by means of the usual hand-lever, 15, pivotally mounted upon the tongue in a position accessible to the seated operator of the machine. The position of the movable clutch-member, 13, is controlled by means of a shifter, 16, fixed upon the rock-shaft, 17, which rock-shaft extends longitudinally of the machine, and has its bearings in the hanger, 18, and gear-case 19, within which the gear, 9, is located. A rocker-arm, 20, is fixed upon the shaft, 17, and pivotally connected with one end of a slide-rod, 21, which is adapted to reciprocate loosely through an aperture in the hanger, 22, depending from the axle, 2. A coil-spring, 23, is confined between the hanger, 22, and a collar, 24, on the rod, 21, tending to force said rod toward the left side of the machine to cause the clutch-member, 12, to engage the clutch-member, 11, in which engaged position of the clutch-members, the knife is driven by the movement of the traction-wheel, 14. A pair of cams, 25 and 26, are rotatively mounted upon the slide-rod, 21, and confined between the collar or nut, 27, on said slide-rod, and the hanger, 22, on the side of the hanger opposite the spring, 23, the action of said spring serving to hold said cams so confined. The cam, 26, has a rocker-arm, 29, connected by a link, 30, with the lower end of the cutter-bar-raising-and-lowering lever, 15.

The cam-members, 25 and 26, have mutually engaging cam-surfaces, 31, whereby an endwise outward movement of the rod, 21, can be caused by a rotative movement of either cam relatively to the other. The tendency of each cam-member, when operated, to rotatively move the other cam-member in the same direction is provided against by means of an arm, 32, on the cam-member, 26, and an arm, 33, on the cam-member, 25, which arms are adapted to engage the hollow shaft, 2, to act as stops in one direction for the respective cam-members. The cam-member, 25, has an operating arm, 34, which serves as a handle whereby said cam-member can be rotatively moved, and the hub of said cam-member, 25, is provided in its inner face with a notch, 35, adapted to engage a rib, 36, on the hanger, 22, to frictionally lock the cam-member, 25, in the position which it assumes when operated to disengage the clutch, as shown in Fig. 7. The cam-surfaces, 31, are so formed that a rotative movement of either cam-member relatively to the other causes the high parts of both cams to abut upon each other, forcing the rod, 21, outward against the force of the spring, 23, and disengaging the clutch-member, 12, thus stopping the operation of the knife-driving mechanism. The cam-members are formed with extended dwells at their high points, whereby when the clutch, 12, has been disengaged by manual operation of the cam-member, 25, the rod, 21, will not be further operated by a movement of the cam, 26, induced by movement of the lever, 15, in raising the cutter-bar.

Figure 2:
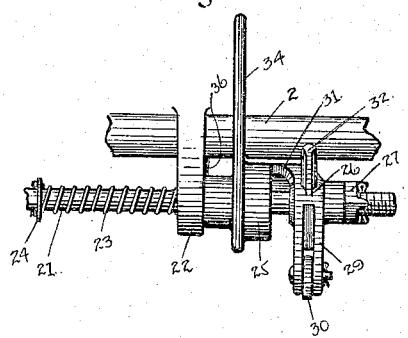

In Figs. 1 and 2 the clutch, 12, is shown disengaged by manual operation of the cam-member, 25.

Figure 3:
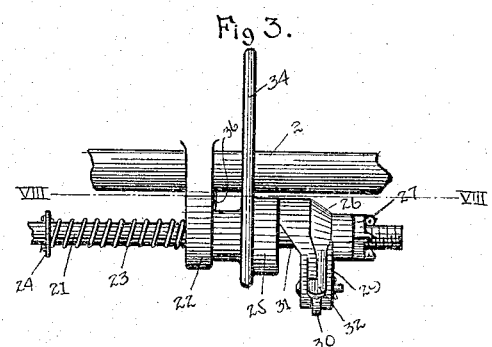

In Fig. 3 the cam-member, 25, is in the same position as in Figs. 1 and 2, and the cam-member, 26, has also been operated by the cutter-bar-lifting movement of the lever, 15.

Figure 4:
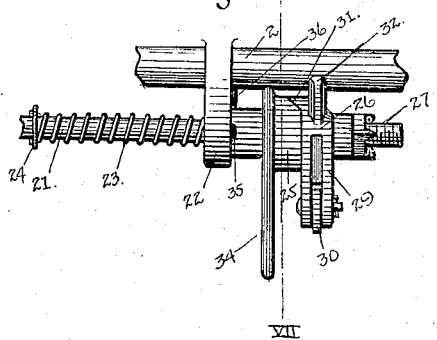

In Fig. 4 both cam-members are in normal position permitting the engagement of the clutch-member, 12.

Figure 5:
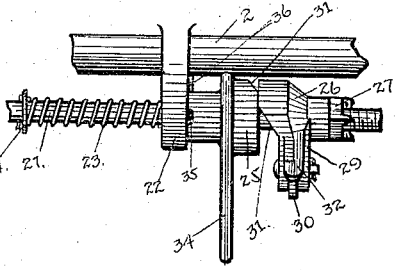

In Fig. 5 the cam-member, 25, is shown in normal position and the cam-member, 26, in the position which it assumes when operated by a cutter-bar-lifting movement of the lever, 15, to release the clutch, 12.

What I claim as new and desire to secure by Letters Patent is—

1. A mowing-machine comprising in combination, a main-frame; cutting apparatus; motion-transmitting means adapted to communicate motion to said cutting apparatus; a clutch-mechanism forming a part of said transmitting means; means for operating the clutch comprising a longitudinally movable rod mounted on the main-frame and connected at one end with said clutch-mechanism; a pair of cams coöperating with each other and rotatively mounted on said rod; a hand-lever pivoted on the main-frame; and connections between the hand-lever and one of the cams, whereby said cam is rotated to move the rod longitudinally when the hand-lever is moved in one direction.

2. A mowing-machine comprising in combination, a main-frame; a cutting apparatus; motion-transmitting means adapted to communicate motion to said cutting apparatus; a clutch-mechanism forming a part of said transmitting means; means for operating said clutch-mechanism, said means comprising a longitudinally movable rod mounted on the main-frame and having one end connected with said clutch-mechanism, a pair of cams coöperative with each other and rotatively mounted on said rod; and means for rotating either of said cams independently of the other in a manner to move the rod longitudinally to disengage said clutch-mechanism.

3. In a mowing-machine, and in combination, a main-frame; a cutting apparatus; motion-transmitting means adapted to communicate motion to said cutting apparatus; a clutch-mechanism forming a part of said transmitting means; means for operating said clutch-mechanism, comprising a longitudinally movable rod, a pair of cams adjacent to, and each engaging and acting as, a resistant to the other, rotatively mounted on said rod; and means for shifting either of the cams independently of the other in a manner to move the rod longitudinally to disengage said clutch-mechanism.

4. In a mowing-machine, and in combination, a vertically movable cutter-bar; a knife on the cutter-bar; a lever and connections for raising and lowering the cutter-bar; knife-driving mechanism, comprising in part a clutch; a shifter for the clutch; a shifter-operating rod; a spring tending to hold the clutch engaged; and a pair of cam members for moving said rod to disengage the clutch, said cam members having mutually abutting cam-surfaces, one of said cam-members being connected with the cutter-bar-raising-and-lowering lever, and the other of said cam-members having means whereby it can be manually operated.

5. In a mowing-machine, and in combination, a vertically movable cutter-bar; a knife on the cutter-bar; a lever and connections for raising and lowering the cutter-bar;

knife-driving mechanism comprising in part a clutch; a shifter for the clutch; a shifter-operating rod; a slideway-bearing for said rod; a spring confined on said rod under compression in engagement with said slideway-bearing on the side toward the clutch; a shoulder on the rod on the opposite side of said slideway-bearing; and a pair of separately rotatable cam-members confined on said rod between said slideway-bearing and said shoulder, said cam-members having mutually abutting cam-surfaces, one of said cam-members being connected with the cutter-bar-raising-and-lowering lever, and the other of said cam members having means whereby it can be manually operated.

In testimony whereof, I have hereunto set my hand this 18th day of August, 1914.

ERNEST C. SMITH.

Witnesses:
EDWARD F. MALEADY,
WM. G. CHAPMAN.

Copies of this patent may be obtained for five cents each, by addressing the "Commissioner of Patents, Washington, D. C."